Sept. 11, 1951 W. J. MORELAND, JR 2,567,889
CONDENSER MICROPHONE STRUCTURE
Filed Feb. 24, 1950 2 Sheets-Sheet 1
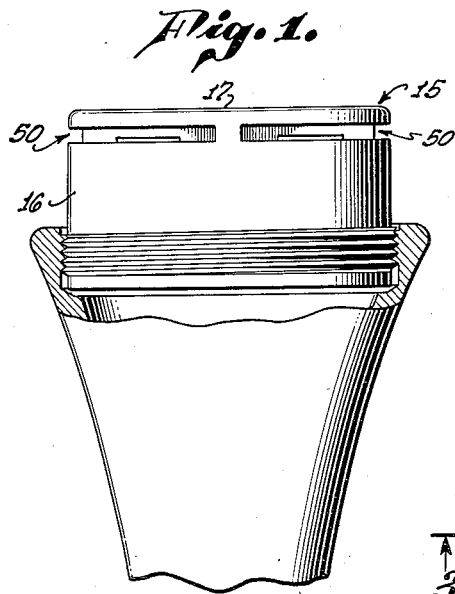
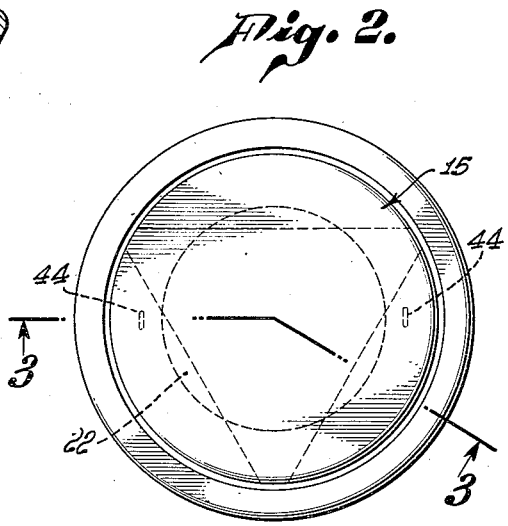
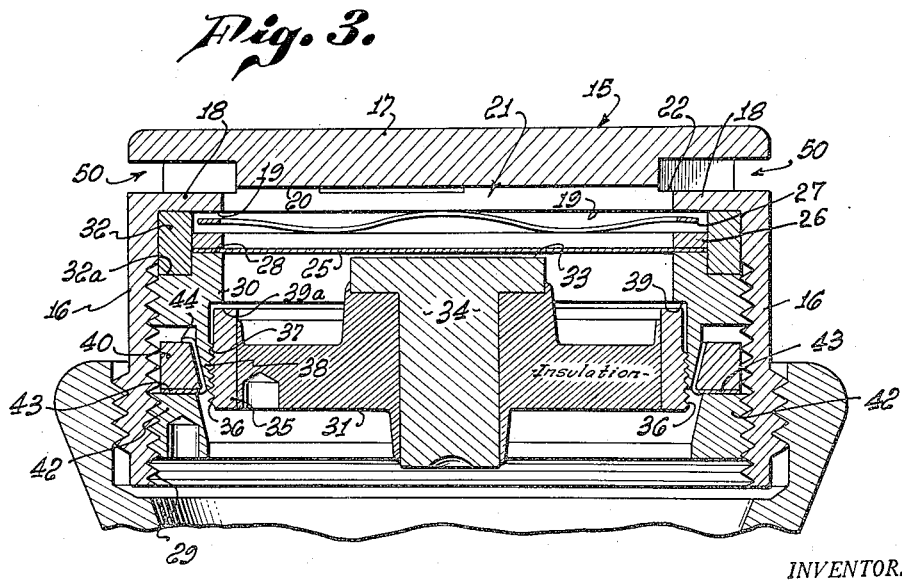
INVENTOR.
WILLIAM J. MORELAND, JR
BY
Barkelew & Fauckberry
ATTORNEYS.

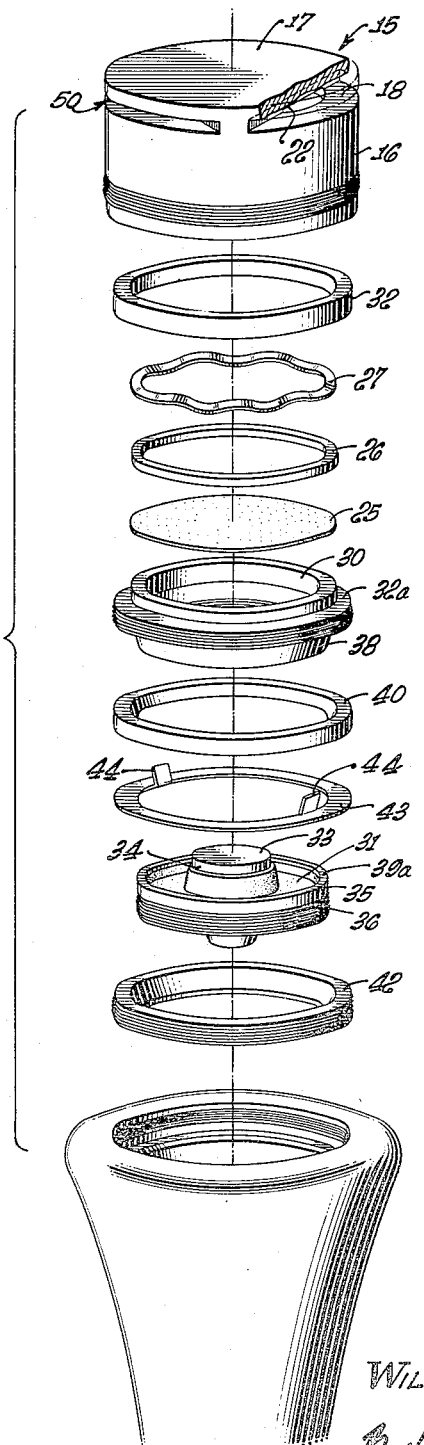

UNITED STATES PATENT OFFICE 2,567,889

CONDENSER MICROPHONE STRUCTURE

William J. Moreland, Jr., Arcadia, Calif., assignor to George L. Carrington, Encino, Calif., as agent Application February 24, 1950, Serial No. 146,133

2 Claims. (Cl. 179—111)

This invention is concerned with improvements in the structure of devices of the condenser type useful generally either as transmitters or receivers, but particularly as microphone transmitters. General objects and purposes of the invention are to provide structure for locating and holding the vibratory condenser diaphragm and the relatively fixed plate accurately and sufficiently rigidly as to produce a device of high physical ruggedness; and to provide for accurate adjustment of spacing and maintenance of exact parallelism between the diaphragm and fixed plate. These and further objectives and accomplishments of the invention, and the invention itself, will be best understood from the following description of a preferred and illustrative embodiment, reference being had for that purpose to the accompanying drawings, in which:

Fig. 1 is an elevation of an illustrative microphone shown in a suitable support;

Fig. 2 is an enlarged plan;

Fig. 3 is a further enlarged section on line 3—3 of Fig. 2; and

Fig. 4 is an exploded perspective.

It may be pointed out that, although not limited in this regard, the present invention is particularly useful in microphones of small size; Fig. 2 showing an actual practical embodiment at a scale of about eight times.

As shown in the drawings the microphone case 15 is composed of a side wall 16, preferably cylindric, and a preferably integral end closure wall 17. The case has an annular shoulder formation 18 which presents an inwardly facing annular shoulder 19 spaced inwardly (downwardly, in the position of the microphone in the drawings) of the inner end wall surface 20. The sound entrance openings 50 are here shown in the form of slots cut through the side wall in such relative location as to communicate with the chamber 21 under the end wall 17 through openings 22 which are located peripherally of the chamber just inside the shoulder formation 18. The relation of these sound openings to the case, and to chamber 21 and diaphragm 25, is the subject matter of a copending application, Ser. No. 146,075, filed on Feb. 24, 1950, by George L. Carrington, entitled Microphone Sound Passage Structure. The present invention is concerned with the internal structure for supporting the diaphragm and other parts of the microphone; and although, in the present practical embodiment, it incidentally makes use of the peripheral shoulder 19, such shoulder insofar as my invention is concerned may be formed in the case in any suitable manner.

In the illustrative embodiment of the present invention a thin circular diaphragm 25 is supported within the case parallel to and spaced from end wall 17. The peripheral portion of the diaphragm is lightly but firmly clamped between the upper annular face 28 of mounting ring 30, and the pressure-distributing washer 26, yieldingly urged downward by the annular leaf spring 27. Mounting ring 30 is threaded into the case on internal threads 29, and is screwed firmly against spacer ring 32, which serves the dual function of providing a seat for the mounting ring and centering the diaphragm and its spring 27 and washer 26. The relatively wide internal annular shoulder 19, which may be considered as a portion of the end wall 17, forms a seat both for spring 27 and for spacer ring 32. The diaphragm is thus uniformly held along its periphery, with its central portion free to vibrate in response to any applied sound pressures. Spacer ring 32, although preferably a separate member, may be integral with the case.

In the illustrated embodiment, the diaphragm forms the movable plate of a variable condenser. The fixed plate of the condenser is provided by the metal surface 33 of the central stud electrode 34, which is typically mounted in spaced coaxial relation within the threaded ring 35 by means of an insulating disk or collar 31 of dielectric material, preferably molded in place and bonded directly to ring 35 and stud 34. Ring 35 is externally threaded at 36 and is screwed into internal threads 37 in the depending skirt 38 of mounting ring 30. The vertical spacing between diaphragm 25 and the parallel surface 33 of stud 34 is adjustable by means of the threads just described, which are locked after that adjustment has been completed by compression of skirt 38 (which may be axially slotted) by forcing the tapered annular clamp ring 40 upward about the tapered skirt. Clamp ring 40 is pressed into place and locked by lock ring 42, threaded directly into the case on the internal threads 29.

The locking action of clamp ring 40 is made more positive by providing localized areas of contact between clamp ring 40 and the skirt 38 of mounting ring 30. That may be accomplished in a variety of ways, typical of which is the illustrative structure of the present preferred embodiment. A thin annular washer 43 is introduced between clamp ring 40 and lock ring 42 and carries circumferentially spaced ears 44 projecting from its inner edge. Those ears are bent upward between the inner face of clamp ring 40 and the outer face of the skirt 38 of the mounting ring and form local areas of effective contact between those faces. The effect of tightening lock ring 42 is thus to slightly deform skirt 38, and to produce firm thread engagement between the internal threads 37 of the skirt and the external threads 36 of ring 35. That type of clamping action maintains electrode face 33 in rigid relation to the equilibrium position of diaphragm 25 both with regard to spacing and to parallelism. It is important that threads 36 and 37 be initially formed to fit very accurately and closely. With such a fit, and with the compressing action on the skirt 38 distributed symmetrically around it, the compression of the skirt on ring 35 to lock it in adjusted position has very little if any tendency to "cock" ring 35 and electrode 34 out of exact proper position. That symmetrical compression of skirt 38 can be had by compressing the skirt all round, by applying compression ring 40 directly to it without the intervention of the spaced ears 44. Symmetrical compression is, however, accomplished with less applied force and with less liability of deforming any of the parts by interposing two or more such ears symmetrically spaced around the skirt. The diametrically opposed position for two such ears is indicated in Fig. 2.

A preferred procedure for providing the correct spacing between the fixed condenser face and the diaphragm, and at the same time insuring accurate parallelism of those elements, is as follows. In initially machining the several parts care is taken that case shoulder 19 is accurately normal to the axis of internal threads 29, and that the opposite seating faces of spacer ring 32 are accurately parallel. Then, in machining mounting ring 30, its seating surface 32a and its seating shoulder 39 are both made accurately normal to the common axis of its external threads and, particularly, its internal threads 37, and in machining the ring 35, its end surface 39a, which opposes seating shoulder 39, is made accurately normal to the axis of its threads 36.

With such initial preparation of the parts, before mounting ring 30 is assembled in the case, the fixed electrode assembly, mounted within ring 35, is threaded into the mounting ring and screwed home against the shoulder 39. That subassembly is then suitably mounted on a surface grinder, and the upper face 33 of stud 34 and the corresponding upper annular face 28 of mounting ring 30 are ground accurately to a common plane accurately normal to the axis of threads 36. It is then possible, by backing the ring 35 away from shoulder 39 through a predetermined angle of rotation, depending upon the pitch of threads 36 and 37, to obtain any desired parallel spacing between the plane of stud face 33 and the plane of face 28 of the mounting ring, which latter face will, of course, directly determine the plane of the diaphragm when the complete microphone is assembled.

In practice, the preferred equilibrium spacing of the condenser plates is approximately 0.001 inch, which is typically obtained, with 80-pitch threads at 36, 37 by backing ring 35 off about 30 degrees from shoulder 39 after completion of the described grinding operation. The optimum spacing varies with the detailed properties of each diaphragm, and the best setting for each instrument is determined under operating test conditions. Various criteria may be employed for determining the final setting. For example, it may be such that the microphone response is the same when measured at 2000 cycles per second and at 5000 cycles per second. Once the desired setting is determined, lock ring 42 is tightened, clamping the threads 36, 37 and insuring at the same time that they are squarely engaged.

Diaphragm 25 is either made of conductive material, or, preferably, is a thin disk of glass or quartz and coated on its upper face with a relatively very thin layer of conductive material in conducting relation to the case proper. Suitable electrical circuit connections are made to the variable condenser 25, 33 of the microphone via the case wall 16 and the lower end of central stud 34. Electrical circuits for transforming variations of capacity between 25 and 33, caused by vibratory movement of the diaphragm, into corresponding electrical oscillations are well known, and need not be described here. Preferably only the central part of the diaphragm is effective. That limitation can be had by conductively coating only the central part of the dielectric diaphragm, or by the illustrated relatively small size of fixed electrode surface 33, or both. The copending application Serial No. 5,943 of William J. Moreland, Jr., filed February 3, 1948, now Patent No. 2,509,310, granted May 30, 1950, may be referred to for further preferred details of the diaphragm and its electrical relation to the fixed electrode.

An important advantage provided by the invention is that the electrode surface 33 is conveniently and accurately adjustable with respect to diaphragm 25 by means of a threaded connection (36, 37) of relatively large diameter. By employing threads of such diameter, whatever play may exist in the threads can produce a relatively small deviation of electrode surface 33 from its correct plane; and the described clamping action of ring 40 is relatively smooth and positive. In order to provide those and other advantages of relatively large diameter adjusting threads, the adjustment is provided, in accordance with the present invention, at a point of the structure radially outside of insulating collar 31. Yet it is not necessary to maintain absolute precision in installing that insulating collar, which, indeed, would not be feasible in a high pressure molding operation. That problem is completely avoided by the above described procedure by which the face 33 of electrode stud 34 is precision ground with direct relation to the upper annular face 28 of mounting ring 30. Such grinding is made possible by the described adjustable relation of ring 35 and mounting ring 30, and is facilitated by the provision of shoulder 39 by which the relative positions of the two rings can be positively determined during the grinding operation.

Although the accuracy of spacing and parallelism which the invention provides is not so important in other types of translation devices as it is in the condenser type, the present improved structure may be used in such other types. For instance, the diaphragm may be composed of or coated with a magnetic material, and the head of stud 34 may represent a plate-like horizontal coil of fine wire in which a varying current is set up by diaphragm movement.

I claim:

1. Structure for a device such as a microphone including in combination, a case having a side wall of generally cylindric internal formation, an internal and inwardly facing shoulder near one end of the case wall, a mounting ring rigidly mounted within the case and having an inner end surface parallel to and spacedly opposing the case shoulder, a radially unstressed diaphragm peripherally seated directly on the inner end surface of the mounting ring in parallel spaced relation to the case shoulder, resilient means located between the diaphragm and the case shoulder and yieldingly pressing on the diaphragm periphery to hold it seated on the mounting ring, whereby the transverse position of the diaphragm is positively determined solely with respect to the mounting ring, a plate-like element having a flat face and which with the diaphragm forms an electrical translation pair, and means for mounting the plate-like element on the mounting ring with its flat face in closely and adjustably spaced parallel relation to the inner face of the diaphragm, the last said means comprising an externally threaded carrier ring with which the plate-like element is rigidly integrated in insulated relation, an internally threaded radially compressible annular formation comprising an integral part of the mounting ring and into which the carrier ring is adjustably threaded, mutually engageable opposed annular shoulders formed respectively on the mounting ring parallel to its said inner end surface and on the carrier ring parallel to the face of the plate-like element, the last said shoulders limiting by their said engagement the inward adjustment of the carrier ring to a position in which the flat face of the plate-like element lies in a common plane with the inner end surface of the mounting ring, a compressing ring surrounding the compressible annular formation of the mounting ring and adapted to compress the same by virtue of relative axial movement, and locking means acting between the case side wall and the compressing ring to shift the latter axially with respect to the mounting ring and thereby to compress the annular formation and lock the carrier ring in its adjusted position, the carrier ring and the said locking means being accessible for adjustment and for locking, respectively, through the other end of the case when the said device is fully assembled.

2. Structure for a device such as a microphone including in combination, a case having a side wall of generally cylindric internal formation, an internal and inwardly facing shoulder near one end of the case wall, a mounting ring rigidly mounted within the case and having an inner end surface parallel to and spacedly opposing the case shoulder, a radially unstressed diaphragm peripherally seated directly on the inner end surface of the mounting ring in parallel spaced relation to the case shoulder, resilient means located between the diaphragm and the case shoulder and yieldingly pressing on the diaphragm periphery to hold it seated on the mounting ring, whereby the transverse position of the diaphragm is positively determined solely with respect to the mounting ring, a plate-like element having a flat face and which with the diaphragm forms an electrical translation pair, and means for mounting the plate-like element on the mounting ring with its flat face in closely and adjustably spaced parallel relation to the inner face of the diaphragm, the last said means comprising an externally threaded carrier ring with which the plate-like element is rigidly integrated in insulated relation, an internally threaded radially compressible annular formation comprising an integral part of the mounting ring and into which the carrier ring is adjustably threaded, a compressing ring surrounding the compressible annular formation and adapted to compress the same by virtue of relative axial movement, the said annular formation having a conically tapered smooth outer face, the compressing ring having an opposing and correspondingly tapered smooth inner face, and there being a plurality of circumferentially spaced localized pressure transmitting members between the said tapered faces, and a locking ring threaded directly into internal threads in the case wall and bearing on the compressing ring to shift the latter axially with respect to the mounting ring and thereby to compress the annular formation and lock the carrier ring in its adjusted position, the carrier ring and the locking ring being accessible for adjustment and for locking, respectively, through the other end of the case when the said device is fully assembled.

WILLIAM J. MORELAND, Jr.

REFERENCES CITED

The following references are of record in the file of this patent:

UNITED STATES PATENTS

| Number | Name | Date |
|---|---|---|
| 1,934,416 | Flanders | Nov. 7, 1933 |
| 2,086,107 | Wilson | July 6, 1937 |